United States Patent
Kalchbrenner et al.

(10) Patent No.: US 11,348,203 B2
(45) Date of Patent: May 31, 2022

(54) IMAGE GENERATION USING SUBSCALING AND DEPTH UP-SCALING

(71) Applicant: DeepMind Technologies Limited, London (GB)

(72) Inventors: Nal Emmerich Kalchbrenner, Amsterdam (NL); Jacob Lee Menick, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/927,490

(22) Filed: Jul. 13, 2020

(65) Prior Publication Data

US 2020/0410643 A1 Dec. 31, 2020

Related U.S. Application Data

(63) Continuation of application No. 16/586,848, filed on Sep. 27, 2019, now Pat. No. 10,713,755.

(60) Provisional application No. 62/737,814, filed on Sep. 27, 2018.

(51) Int. Cl.
   *G06T 3/40* (2006.01)

(52) U.S. Cl.
   CPC .......... *G06T 3/4046* (2013.01); *G06T 3/4053* (2013.01)

(58) Field of Classification Search
   CPC ...... G06T 3/4046; G06T 3/4053; G06T 11/00
   See application file for complete search history.

(56) References Cited

U.S. PATENT DOCUMENTS

| 4,979,136 A * | 12/1990 | Weiman | G06T 5/20 348/606 |
|---|---|---|---|
| 2014/0212046 A1* | 7/2014 | Wong | G06K 9/38 382/194 |
| 2019/0138838 A1* | 5/2019 | Liu | G06T 5/002 |

FOREIGN PATENT DOCUMENTS

WO  WO 2018/154092  8/2018

OTHER PUBLICATIONS

James L Murphy, Daniel R Helman, Lewis E Hitchner, "Managing Digital Images In A Network Environment," Proc. SPIE 0900, Imaging Applications in the Work World, (May 11, 1988); https://doi.org/10.1117/12.944684.*

(Continued)

*Primary Examiner* — Charles T Shedrick
(74) *Attorney, Agent, or Firm* — Fish & Richardson P.C.

(57) ABSTRACT

Methods, systems, and apparatus, including computer programs encoded on computer storage media, for generating output images. One of the methods includes obtaining data specifying (i) a partitioning of the H by W pixel grid of the output image into K disjoint, interleaved sub-images and (ii) an ordering of the sub-images; and generating intensity values sub-image by sub-image, comprising: for each particular color channel for each particular pixel in each particular sub-image, generating, using a generative neural network, the intensity value for the particular color channel conditioned on intensity values for (i) any pixels that are in sub-images that are before the particular sub-image in the ordering, (ii) any pixels within the particular sub-image that are before the particular pixel in a raster-scan order over the output image, and (iii) the particular pixel for any color channels that are before the particular color channel in a color channel order.

20 Claims, 5 Drawing Sheets

(56) References Cited

OTHER PUBLICATIONS

PCT International Preliminary Report on Patentability in International Appln. No. PCT/US2019/053666, dated Apr. 8, 2021, 10 pages.
Arora et al., "Do GANs actually learn the distribution? An Empirical Study," CoRR, Jun. 2017, arXiv: 1706.08224v2, 11 pages.
Chen et al.. "PixelSNAIL: An Improved Autoregressive Generative Model," CoRR, Dec. 2017, arXiv:1712.09763v1, 6 pages.
Hou et al., "Image Companding and Inverse Halftoning using Deep Convolution Neural Networks," CoRR, Jul. 2017, arXiv:1707.00116v2, 12 pages.
Jouppi et al., "In—Datacenter Performance Analysis of a Tensor Processing Unit," Proceedings of the 44th Annual International Symposium on Computer Architecture—ISCA, 2017, 12 pages.
Kalchbrenner et al. "Video pixel networks," CoRR, Oct. 2016, arXiv:1610.00527, 11 pages.
Kalchbrenner et al. "Efficient Neural Audio Synthesis," CoRR, Feb. 2018, arXiv:1802.08435v2, 10 pages.
Karras et al., "Progressive Growing of GANs for Improved Quality, Stability, and Variation," CoRR, Oct. 2017, arXiv:1710.10196v3, 26 pages.
Kingma et al., "Glow: Generative Flow with Invertible 1×1 Convolutions," Advances in Neural Information Processing Systems 31, 2018, 10 pages.
Kolesnikov et al.. "Deep Probabilistic Modeling of Natural Images using a Pyramid Decomposition," CoRR, 2016, arXiv:1612.08185, 9 pages.
Mescheder et al, "Which Training Methods for GANS do actually Converge?," CoRR, Jan. 2018, https://arxiv.org/abs/1801.04406, 39 pages.
Parmar et al., "Image Transformer," CoRR, Feb. 2018, arXiv:1802.05751v3, 10 pages.
PCT International Search Report and Written Opinion in International Appln. No. PCT/US2019/053666, dated Nov. 27, 2019, 17 pages.
Reed et al., "Parallel Multiscale Autoregressive Density Estimation," CoRR, Mar. 2017, arXiv:1703.03664v1, 16 pages.
Van den Oord et al.. "Conditional Image Generation with PixelCNN Decoders," Advances in Neural Information Processing Systems 29, 2016, 9 pages.
Van den Oord et al., "WaveNet: A Generative Model for Raw Audio," CoRR, Sep. 2016, arXiv:1609.03499v2, 15 pages.
Vaswani et al., "Attention is all you need," Advances in Neural Information Processing Systems 30, 2017, 11 pages.
Vaswani et al., "Tensor2Tensor for Neural Machine Translation." CoRR, Mar. 2018, arXiv:1803.07416v1, 9 pages.
Wu et al., "Googles Neural Machine Translation System: Bridging the Gap Between Human and Machine Translation," CoRR, Sep. 2016, arXiv:1609.08144v2, 23 pages.

* cited by examiner

IMAGE GENERATION USING SUBSCALING AND DEPTH UP-SCALING

CROSS-REFERENCE TO RELATED APPLICATIONS

This is a continuation of U.S. application Ser. No. 16/586,848, filed on Sep. 27, 2019, which claims priority to U.S. Application No. 62/737,814, filed on Sep. 27, 2018. The disclosures of the prior applications are considered part of and are incorporated by reference in the disclosure of this application.

BACKGROUND

This specification relates to generating images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that generates an image using a generative neural network.

In some implementations, the system implements sub-scaling. In particular, the system generates an H×W×C×D output image (where H and W are respectively the height and width of the image in numbers of pixels; C is the number of channels, e.g., 3, and D is the number of bits in each channel) by partitioning the H by W pixel grid of the output image into K disjoint, interleaved sub-images, where K is an integer that is less H. The sub-images are referred to as interleaved because pixels within one sub-image are generally separated from other pixels within the same sub-image by pixels in another sub-image. For example, if there are 4 sub-images, every $4^{th}$ pixel along the horizontal dimension will be in the same sub-image and every $4^{th}$ pixel along the vertical dimension will be in the same sub-image. The system then generates the output image sub-image by sub-image using a generative neural network, i.e., following an ordering of the sub-images, e.g., a raster-scan ordering.

In some implementations, the system implements depth upscaling (e.g., of an image of the real world, e.g., captured by a camera) in addition to or instead of subscaling. In particular, when generating an image that includes N bit intensity values, the system first generates an initial output image that has b bit intensity values (where b is less than N) and then generates the remaining N−b bits of each intensity value conditioned on the initial output image. For the generation of either the initial output image or the final output image or both, the system can implement subscaling.

Certain novel aspects of the subject matter of this specification are set forth in the claims below.

The subject matter described in this specification can be implemented in particular embodiments so as to realize one or more of the following advantages.

Conventional autoregressive generative neural networks are generally only able to generate high fidelity images when the sizes of the images that they are configured to generate are relatively small and even then these models tend to require a large amount of memory and computation to generate the image. In particular, generating larger images autoregressively requires encoding a vast context when generating at least some of the intensity values in the image and training the generative neural network requires learning a distribution over a very large number of variables that preserves both global semantic coherence and exactness of detail. The described systems, on the other hand, can generate high fidelity images even when the sizes of the images are large while preserving image-wide spatial dependencies that are responsible for the high quality of images generated by autoregressive generative neural networks. In particular, the described systems generate an image as a sequence of sub-images. This allows the described system to preserve in the sub-images the spatial structure of the pixels while compactly capturing image-wide spatial dependencies. Thus, the described systems require only a fraction of the memory and the computation that would otherwise be required to generate a large image while still generating high fidelity images. Additionally, the described systems can perform depth-upscaling, i.e., first generating a first subset of the bits of all of the intensity values in the image and then generating the remaining bits conditioned on the first subset, to further increase the capacity of the described systems for generating very high-fidelity large-scale image samples.

The reduction in memory and processing power requirement makes some implementations of the present concepts suitable for use in mobile devices, such as mobile devices including a unit (e.g., a camera) which is used for capturing an image of the real world which is used (possibly following some pre-processing) in some implementations of the concepts described herein as an input image to the image generation system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes an image generation system that generates images using a generative neural network.

As will be described below, in some implementations, the system generates images unconditionally, i.e., generates images that appear as if they were images drawn from a training set used to train the image generation system but that are not otherwise conditioned on any external input.

In some other implementations, the system generates higher-resolution images conditioned on a lower-resolution input image, i.e., the system performs super-resolution to generate higher-resolution versions of input images.

In some other implementations, instead of or in addition to increasing the resolution of the input image, the system can increase the quality of the input images by converting the intensity values in the input image to a higher bit depth, e.g., converting input images from 3 bit intensity values to 8 bit intensity values or converting input images from 6 bit intensity values to 16 bit intensity values. Generally, the system can convert input images from a low bit depth to a higher bit depth, i.e., with the low bit depth being one half or less than one half of the higher bit depth.

In some other implementations, the system receives a different conditioning input (e.g., a conditioning input which is not itself an image, and may not have components that correspond to respective portions of the output image) that identifies properties of an image and generates an output image that has the identified properties.

Figure 1:
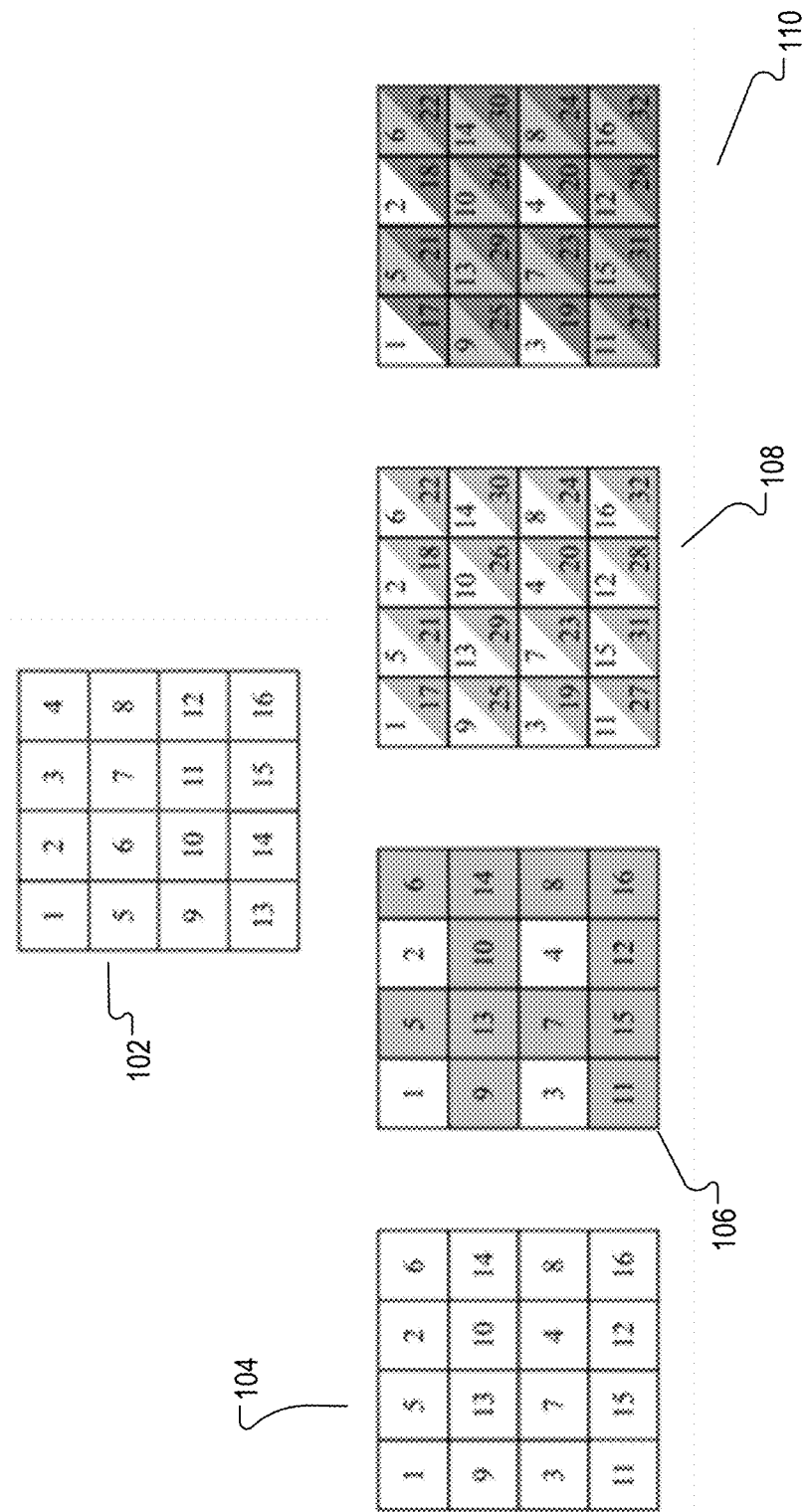
FIG. 1 illustrates different techniques that can be employed by an image generation system when generating an image.

FIG. 1 illustrates different techniques that can be employed by the image generation system when generating an output image.

In the examples of FIG. 1, the output image being generated by the system is a 4×4 image that therefore includes 16 pixels for which intensity values need to be generated to generate the output image. To generate an output image, the system generates, for each pixel, respective intensity values for each of one or more color channels. When the image generation system is configured to generate greyscale images, there is only a single color channel per pixel. When the image generation system is configured to generate color images, there are multiple color channels per pixel. For example, the set of color channels can include a red color channel, a green color channel, and a blue color channel. As a different example, the set of color channels include a cyan color channel, a magenta color channel, a yellow color channel, and a black color channel. When there are multiple color channels, the multiple color channels are arranged according to a predetermined channel order, e.g., red, green, and then blue, or blue, red, and then green.

FIG. 1 includes an illustration 102 of a generation order for a conventional technique for generating intensity values for an output image.

In the generation order shown in the illustration 102, the system generates the intensity values for the 16 pixels in the image in a raster-scan order. In raster-scan order, the system starts at the top left (pixel #1) and then proceeding row by row along the image until reaching the bottom right (pixel #16). Within each pixel, the system generates the intensity values for the color channels according to the predetermined channel order, e.g., first red, then green, then blue or first blue, then red, then green.

Generally, to improve the quality of the generated image, the system would generate the intensity values for each pixel autoregressively, so that the intensity value for a given color channel for a given pixel is conditioned on the intensity values that have already been generated, i.e., on the intensity values for pixels that are ahead of (i.e., before) the given pixel in the generation order and any intensity values for the given pixel that have already been generated (when the given color channel is not the first color channel in the predetermined order). Thus, the intensity values for the bottom left pixel (pixel #11) would be conditioned on the intensity values for pixels 1 through 10 in the ordering. The system can generate these intensity values value by value using a generative neural network, i.e., by conditioning the generative neural network differently for each value that needs to be generated.

However, when images become large, generating the intensity values in this manner requires encoding a vast context when generating at least some of the intensity values in the image, e.g., pixels that are near the end of the generation order. That is, when the number of pixels in the image becomes large, generating the intensity value for a pixel that is near the end of the order requires conditioning the generative neural network on a very large number of intensity values, i.e., intensity values for almost all of the pixels in the very large image. This makes generating the output image very computationally intensive and training the generative neural network to generate high quality images very difficult and, in at least some cases, infeasible when the image size is large. This is because training the generative neural network in this generation scheme requires learning a distribution over a very large number of variables that preserves both global semantic coherence and exactness of detail.

This specification describes several generation schemes that account for these and other issues and allow the image generation system to generate high quality images even when the image is large (e.g., at least 64 pixels in each axis) while reducing how many computational resources are consumed.

One generation technique that can be employed is referred to as subscaling, which is shown in illustration 104.

To perform subscaling, the system partitions the H by W pixel grid of the output image into K disjoint, interleaved sub-images (also known as "slices") and orders the sub-images into a sub-image order. Because K is greater than 1, each sub-image includes less than all of the pixels in the image. The sub-images are referred to as being interleaved because pixels within one sub-image are generally separated from other pixels within the same sub-image by pixels in another sub-image, i.e., pixels within a sub-image are not adjacent to each other within the output image.

In particular, to generate the partitioning, the system receives a scaling factor S and the system generates sub-images of size H/S×W/S by selecting a pixel every S pixels in both height and width, with each sub-image having a different row and column offset relative to the other sub-images. This results in the entire spatial grid of the image being covered by $K=S^2$ sub-images. For simplicity below it is assumed that H and W are multiples of S; if not, this can be addressed in various ways, e.g., by padding the image with additional pixels to increase H and W to be multiples of S.

The system then generates the sub-images one-by-one according to the sub-image order. Within each sub-image, the system generates intensity values autoregressively in raster-scan order of the pixels within the sub-image.

In the example shown in illustration 104, the system has divided the 4×4 image into 4 2×2 sub-images and the sub-image order orders the sub-images in raster-scan order based on the locations of the top left corner pixel of each sub-image in the output image. Sub-image 1 (according to the sub-image order) includes the pixels numbered 1, 2, 3, and 4 in illustration 104, sub-image 2 includes the pixels numbered 5, 6, 7, 8, sub-image 3 includes the pixels numbered 9, 10, 11, and 12, and sub-image 4 includes the pixels numbered 13, 14, 15, and 16. As can be seen from illustration 104, the sub-images are interleaved, i.e., with pixel 1 assigned to sub-image 1 being separated from the other pixels in sub-image 1 by pixels in the other sub-images.

The system then generates the intensity values within each sub-image autoregressively, conditioned on intensity values for any pixels within the sub-image that have already been generated and intensity values for pixels in any sub-images that are before the sub-image in the sub-image order. That is, for each particular color channel for each particular pixel in each particular sub-image, the system, generates, using a generative neural network, the intensity value for the particular color channel conditioned on intensity values for (i) any pixels that are in sub-images that are before the particular sub-image in the ordering of the sub-images, (ii) any pixels within the particular sub-image that are before the particular pixel in a raster-scan order over the output image, and (iii) the particular pixel for any color channels that are before the particular color channel in the color channel order. Additionally, the intensity value for the particular color channel is not conditioned on any intensity values that are for (i) any pixels that are in sub-images that are after the particular sub-image in the ordering of the sub-images, (ii) any pixels within the particular sub-image that are after the particular pixel in the raster-scan order over the output image, and (iii) the particular pixel for any color channels that are after the particular color channel in the color channel order.

For example, as can be seen in illustration 104, pixel number 7, which belongs to sub-image 2, is the 7th pixel to be generated within the output image, after the 4 pixels in sub-image 1 and the 2 pixels in sub-image 2 that are before pixel number 7 in raster-scan order over the output image. The intensity values for pixel number 7 will be conditioned on all of the intensity values for the pixels in sub-image 1, the intensity values for pixels 5 and 6 in sub-image 2, and any intensity values for any color channels of pixel number 7 that have already been generated. The intensity values will not be conditioned on pixel number 8, which is in sub-image 2 but after pixel number 7 in the raster-scan order, or pixels 9-16, which are in sub-images 3 and 4 (that are after sub-image 2 in the sub-image order).

As will be described in more detail below, subscaling allows the system to more efficiently generate output images. In particular, subscaling allows the system to generate an output image by preserving, within the sub-images, the spatial structure of the pixels while compactly capturing image-wide spatial dependencies when conditioning the generative neural network. Thus, the described systems require only a fraction of the memory and the computation that would otherwise be required to generate a large image while still generating high fidelity images. In particular, when generating a particular sub-image, this scheme can allow the system to condition a decoder neural network on a decoder input that has the same spatial dimensions as the sub-image and that captures the image-wide spatial dependencies, no matter where in the order the particular sub-image is located. Thus, the system can generate a large image while conditioning the decoder on decoder inputs that have spatial dimensions that are much smaller than the spatial dimensions of the large image, i.e., that only have the same (much smaller) spatial dimensions as each of the sub-images of the large image.

Subscaling also allows the system to perform image upscaling, where a low-resolution image (such as an image of the real world, e.g., captured by a camera) is transformed to a higher-resolution image of the same scene. In the example shown in FIG. 1, the system can perform up-scaling from a 2×2 image to a 16×16 image. In particular, illustration 106 shows the system performing image up-scaling by using the input, lower-resolution image as the first sub-image in the sub-image order. That is, instead of generating the first sub-image, the system can fix the first sub-image to be the input image and generate the remaining sub-images conditioned on the fixed first sub-image.

In the example shown in illustration 106, the system has received an input 2×2 image and assigned the pixels of the input 2×2 image to be the pixels in the first sub-image, i.e., the pixels 1, 2, 3, and 4. The system then generates the remaining pixels 5-16 as described above, conditioned on the fixed first sub-image. The pixels 5-16 are shaded in the illustration 106 while pixels 1-4 are not because the shaded pixels are generated by the system while the unshaded pixels are pixels that are fixed based on the input image received by the system.

Instead of or in addition to subscaling, the system can also use a depth upscaling technique. In particular, the intensity value for any given pixel in the output image can be represented as N bits, i.e., the intensity values are N−bit values.

To generate the output image when using depth upscaling, the system first generates an initial H by W image, where the pixels in the initial H by W image include only the first b most significant bits of the N-bit intensity values for each of the color channels. The system can either generate this initial image using subscaling or using the conventional ordering described above. The system then generates, from the initial H by W image, the N−b least significant bits of the N−bit intensity values of the color channels for each of the pixels in the output image. That is, the system first generates the b most significant bits of each of the intensity values in the image and then generates the N−b least significant bits of each of the intensity values in the image conditioned at least on the most significant bits. The system can either generate these additional bits using subscaling or using the conventional ordering described above.

Illustration 108 shows a combination of subscaling and depth upscaling. In the illustration 108, each pixel in the output image is divided into an initial pixel (with b bit color intensity values) and an additional pixel (with N−b color intensity values). Together, the initial pixel and the additional pixel determine the N−bit intensity values for the output pixel, i.e., by using the b bits of the initial pixel as the most significant bits and the N−b bits as the least significant bits.

As shown in illustration 108, the system generates the initial pixels 1-16 using the subscaling techniques described above. The system then generates the additional pixels 17-32 using the subscaling techniques described above, but also conditioned on the initial pixels 1-16. Thus, the system first generates an initial image that has b bit intensity values and then generates the remaining N−b bits of the N bit intensity values in the final output image.

The combination of subscaling and depth subscaling can also allow the system to upscale the depth of an input low-resolution image while also up-scaling the resolution of the image. In the example shown in illustration 110, the system has received an input 2×2 image where all of the intensity values are b bit values. The system has assigned the pixels of the input 2×2 image to be the pixels in the first sub-image of initial pixels, i.e., the initial pixels 1, 2, 3, and 4, of the initial output image. The system then generates the remaining initial pixels 5-16 of the initial output image as described above, conditioned on the fixed first sub-image, and then generates the least significant bits, i.e., the additional pixels 17-32, conditioned on the initial output image. The pixels 5-32 are shaded in the illustration 110 while pixels 1-4 are not because the shaded pixels are generated by the system while the unshaded pixels are pixels that are fixed based on the input image received by the system.

Figure 2:
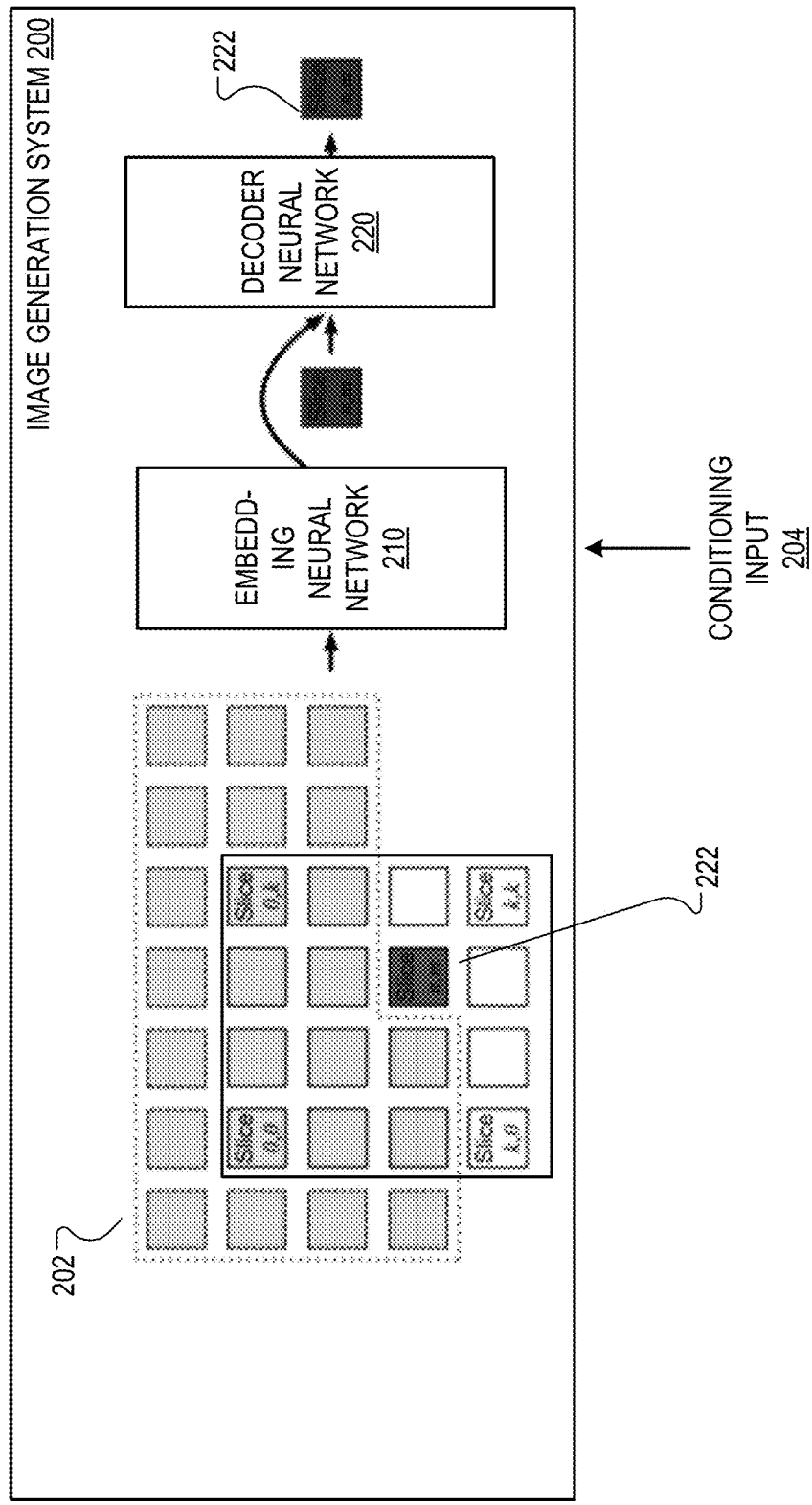
FIG. 2 shows an example image generation system.

FIG. 2 shows an example image generation system 200 that performs subscale image generation. The image generation system 200 is an example of a system implemented as computer programs on one or more computers in one or more locations in which the systems, components, and techniques described below are implemented.

The system 200 generates a target sub-image 222 in the output image conditioned on the sub-images that are before the target sub-image in the sub-image order. In particular, the system 200 generates the intensity values in the target sub-image 222 conditioned on the intensity values for the pixels in any sub-images that are before the target sub-image in the sub-image order.

The system 200 includes an embedding neural network 210 and a decoder neural network 220.

To generate the target sub-image 220, the system 200 processes an embedding input 202 using the embedding neural network 210 to generate an encoded sub-image tensor.

The system 200 then auto-regressively generates the intensity values of the pixels in the target sub-image 222 conditioned on the encoded sub-image tensor generated by the embedding neural network 210 using the decoder neural network 220. The generation is referred to as auto-regressive because the system 200 generates the intensity values within the sub-image one-by-one, with the operations performed to generate any particular intensity value being dependent on the already-generated intensity values.

In particular, for each particular color channel for each particular pixel in the target sub-image 222, the system 200 generates, using the decoder neural network 220, the intensity value for the particular color channel conditioned on (i) the encoded sub-image tensor that encodes the intensity values for pixels that are in sub-images that are before the target sub-image in the ordering of the sub-images, (ii) intensity values for any pixels within the target sub-image 222 that are before the particular pixel in a raster-scan order over the output image, and (iii) intensity values for the particular pixel for any color channels that are before the particular color channel in the color channel order.

As described above, the embedding input 202 to the embedding neural network 210 generally includes the intensity values for the sub-images that are before the target sub-image 222 in the sub-image order. In the particular example of FIG. 2, the target sub-image 222 is the sub-image with offset (n,m) in the output image relative to the top left of the output image. Thus, if the location of the top left pixel in the original image is denoted by (0,0), the top left pixel in the target sub-image 222 is the pixel at location (n,m) in the output image, the next pixel in raster-scan order is the pixel at location (n,m+S), and the last pixel in the sub-image in raster-scan order is the pixel at location (n+H−S, m+W−S) in the output image.

Accordingly, the embedding input 202 includes the intensity values for the sub-images ahead of the target sub-image 222 in the sub-image order, i.e., the sub-images with offsets less that are before pixel (n,m) in raster-scan order of the output image, i.e., the sub-images with offsets that have row offsets of less than n and sub-images with offsets equal to n but column offsets less than m.

As a particular example, the embedding input 202 can include the already generated sub-images concatenated along the depth dimension. In some of these cases, the embedding input 202 can include empty padding sub-images, i.e., sub-images with all intensity values set to zero or to another predetermined default value, to preserve the ordering of each already generated sub-image relative to the target sub-image and to ensure that the embedding input 202 is the same size for each sub-image, i.e., so that the total number of sub-images in the depth concatenated input is always the same.

In FIG. 2, this scheme for generating the embedding input 202 is illustrated as follows: sub-images are represented by rectangles, and the rectangles within the dashed lines are depth concatenated in raster-scan order to generate the embedding input 202 for the target sub-image 222. Additionally, the rectangles within the solid lines are the sub-images that are part of the output image, while the rectangles inside the dashed lines but outside the solid lines are the empty padding sub-images that are added to the embedding input 202 to fix the size of the input and preserve relative positions within the embedding input 202. The rectangles outside the dashed lines but within the solid lines, on the other hand, are the sub-images that are after the target sub-image 222 in the sub-image generation order and are therefore not included in the embedding input 202.

In some cases, the embedding input 202 can also include data specifying a position of the particular sub-image in the ordering. For example, the embedding input 202 can include the meta-position of the target sub-image, i.e., the offset coordinates of the target sub-image, as an embedding of 8 units tiled spatially across a sub-image tensor.

The system can represent intensity values in any of a variety of ways in inputs that are processed by the embedding neural network 210 and the decoder 220. For example, the system can represent intensity values as floating point numbers. As another example, the system can represent intensity values as binary vectors. As another example, the system can represent intensity values as one-hot encoded vectors. As yet another example, the system can represent intensity values as either pre-trained or jointly learned embeddings having a fixed dimensionality, e.g., an eight dimensional vector or a sixteen dimensional vector.

The embedding neural network 210 can have any appropriate structure that allows the neural network to process the embedding input 202 to generate an encoded sub-image tensor that summarizes the context of the target sub-image 222 for use by the decoder neural network 220.

The encoded sub-image tensor is generally a feature map has the same spatial size as the sub-images of the output image, i.e., H/S×W/S. That is, the encoded sub-image tensor includes a respective encoded representation, i.e., a respective feature vector, for each position in the target sub-image 222.

As a particular example, the embedding neural network 210 can be a convolutional neural network with residual blocks. A residual block refers to a sequence of layers, including one or more convolutional layers, that have an input connection between the input to the first layer of the block and the output of the last layer in the block. In some cases, the embedding neural network 210 includes a series of self-attention layers that are followed by multiple residual blocks of convolutional layers.

The decoder neural network 220 receives the encoded sub-image tensor and uses the encoded sub-image tensor to autoregressively generate the intensity values for the pixels in the target sub-image 222 in raster-scan order.

In particular, the decoder neural network 220 takes as input the encoded sub-image tensor in a position-preserving manner, i.e., so that the associations between encoded representations and their corresponding positions in the target sub-image 222 are preserved. That is, the encoded sub-image tensor is spatially aligned with the tensor that includes the intensity values of the target sub-image, so that the encoded representation of a given intensity value from previous sub-images is located at the same spatial location as the corresponding intensity value in the target sub-image. This can be accomplished by, at each iteration during the auto-regressive generation, depth concatenating a representation of the current target sub-image as of the iteration with the encoded sub-image tensor as will be described below.

The decoder neural network 220 can generally have any architecture that allows the decoder to receive as input, for a given pixel within the sub-image and a given color channel (i) the encoded sub-image tensor and (ii) the already generated intensity values for pixels within the sub-image and to generate an output that defines a probability distribution over possible intensity values for the given color channel of the given pixel. The system 200 can then select the intensity value for the given color based on the probability distribution, e.g., by sampling a value from the distribution or selecting the value with the highest probability.

As a particular example, the decoder neural network 220 can have a hybrid architecture that combines masked convolution and self-attention to generate intensity values conditioned only on already generated intensity values within the sub-image and the encoded sub-image tensor. For example, the system can reshape the sub-image into a one-dimensional tensor and then apply a one-dimensional masked self-attention neural network that attends over the already generated intensity values (while not attending to any future intensity values due to the masking) to generate an attended one-dimensional tensor. The system can then reshape the attended one-dimensional tensor into a two-dimensional tensor and depth concatenate the two-dimensional tensor with the encoded sub-image tensor and provide the depth concatenated tensor as a conditioning input to a gated convolutional neural network that applies masked convolutions to generate the distribution over intensity values. An example one dimensional masked self-attention neural network is described in Attention is All you Need, Vaswani, et al, arXiv:1706.03762. An example gated convolutional neural network is described in Conditional Image Generation with PixelCNN Decoders, van den Oord, et al, arXiv:1606.05328.

During training, this can be performed in parallel for all of the pixels in the sub-image, while after training and during inference, the decoder neural network 220 processes auto-regressively to generate intensity values within the sub-image one by one in raster-scan order.

As can be seen in the above description, the system can generate a large, high-fidelity image even though the spatial dimensions of the tensors processed by the embedding neural network and the decoder neural network are fixed to the dimensions of the slices of the larger output image. For example, using 32×32 slices, the system can generate a 128×128 or 256×256 output image while only needing to process tensors that have dimensions 32×32. This allows the system to preserve in the sub-images the spatial structure of the pixels while compactly capturing image-wide spatial dependencies even when the size of the output image to be generated is quite large.

In particular, as can be seen above, the embedding neural network 210 and the decoder neural network 220 jointly generate an H×W image while only processing inputs that have smaller spatial dimensions, i.e., the H/S×W/S dimensions of the sub-images. Thus, this scheme can allow the system to condition the decoder neural network 210 in a manner that captures the image-wide spatial dependencies without needing to process tensors with large spatial dimensionalities no matter where in the order the particular sub-image is located. Thus, the system can generate a large image while conditioning the embedding network and the decoder on inputs that have spatial dimensions that are much smaller than the spatial dimensions of the large image, i.e., that only have the same (much smaller) spatial dimensions as each of the sub-images of the large image. This can result in a significant savings in memory and processing power relative to conditioning a generative neural network on all of the previously generated intensity values directly while still effectively capturing image-wide dependencies.

In some cases, the system 200 generates the output image conditioned on a conditioning input 204.

In some of these cases, the system performs super-resolution to generate higher resolution versions of input images. That is, the conditioning input 204 is a lower-resolution image. In these cases, the system 200 can generate the first sub-image in the sub-image order from the lower-resolution image as described above and then proceed with generating the remainder of the sub-images in the output image. In other words, the first sub-image is fixed to the lower-resolution image instead of generated by the system 200.

In others of these cases, the system 200 receives a different conditioning input 204 that identifies properties of an image and generates an output image that has the identified properties. In other words, the conditioning input 204 is a conditioning tensor characterizing a desired content of the output image, e.g., a desired category label for the output image. In these cases, the system 200 can condition the activation functions of the convolutional layers in the embedding neural network 210, the decoder neural network 220, or both on the conditioning tensor. Conditioning activation functions of convolutional layers on a conditioning tensor is described in more detail in Conditional Image Generation with PixelCNN Decoders, van den Oord, et al, arXiv:1606.05328.

The system can train the embedding neural network 210 and the decoder neural network 220 jointly to cause the embedding neural network 210 and the decoder neural network 220 to generate high quality output images.

In particular, the system 200 can train these neural networks by repeatedly obtaining ground truth images, i.e., output images that should be generated by the system and, when used, conditioning inputs for the ground truth images. The system 200 can then uniformly sample a sub-image from each ground truth image and generate the sampled sub-image using the neural networks conditioned on the earlier sub-images from the ground truth image (and the conditioning input, when used). The system 200 can then determine gradients of a loss that measures the log likelihood of the intensity values in the ground truth image according to the probability distributions generated by the neural networks when generating the sampled sub-image and update the values of the parameters of the neural networks using the determined gradients using an appropriate neural network optimizer, e.g., rmsProp, Adam, or stochastic gradient descent. By repeatedly performing this updating, the system 200 generates trained parameter values that result in high fidelity images being generated. Because the system 200 only needs to generate a relatively small sized sub-image for each ground truth output image (rather than the entire output image) in order to update the parameters of the networks, the system 200 can perform this training in a computationally efficient manner.

Figure 3:
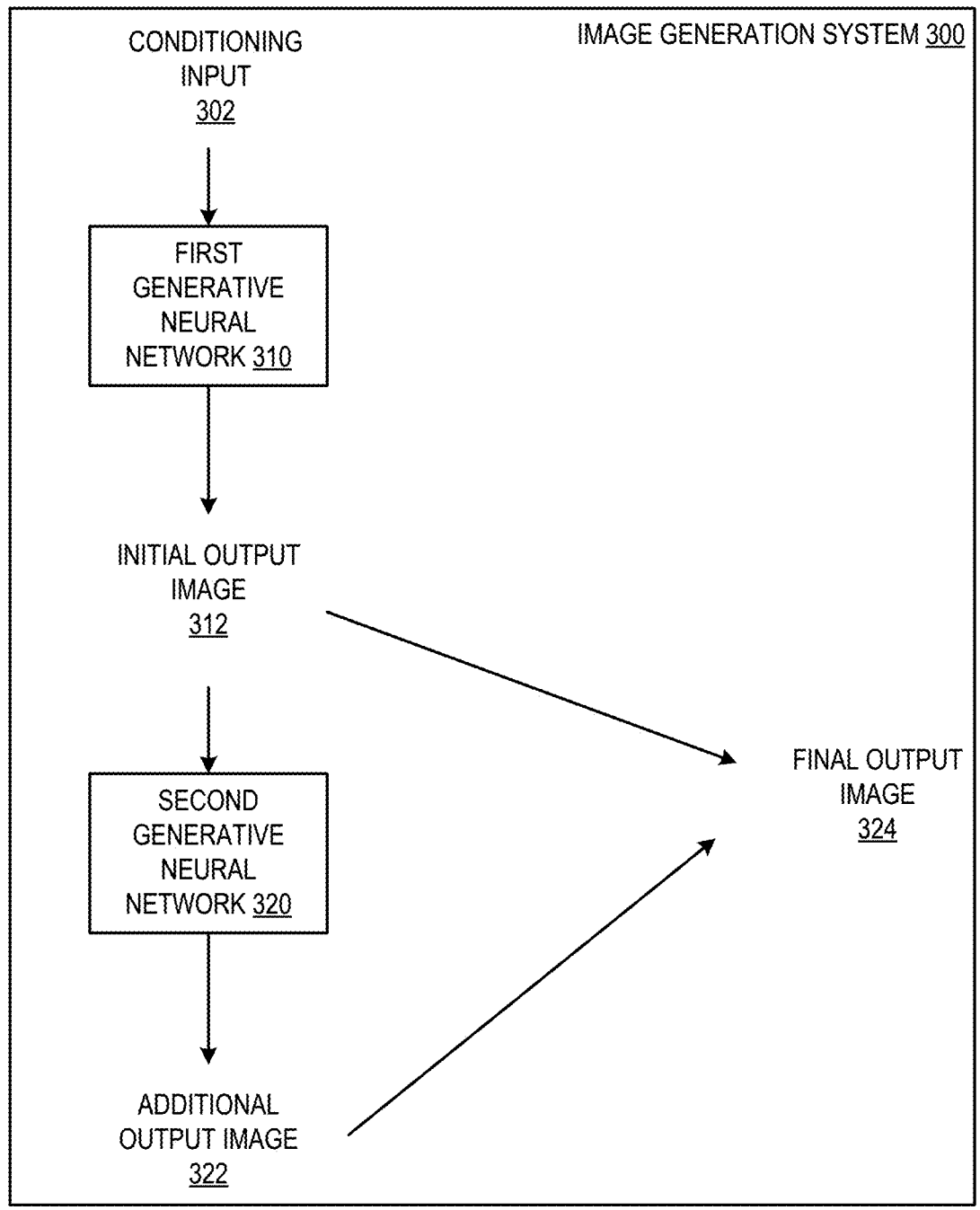
FIG. 3 shows another example image generation system.

FIG. 3 shows an image generation system 300 that generates output images using depth upscaling.

In particular, the system 300 generates H by W output images that have N-bit intensity values using depth upscaling by first generating an initial H by W output image 312 that includes b bit intensity values and then generating an additional H by W output image 322 that has H-b bit intensity values. Generally, b is an integer that is less than N. For example, when N is eight, i.e., the output image is an image with 8 bit intensity values, b can be three or four. As another example, when N is sixteen, b can be three or six.

The system 300 can then generate a final output image 324 that includes N-bit intensity values by, for each intensity value, using the b bits of the corresponding intensity value, i.e., the intensity value for the same color channel of the same pixel, in the initial output image 312 as the b most significant bits of the N bits and the N-b bits of the corresponding intensity value in the additional output image 322 as the N-b least significant bits of the N bits.

More specifically, the system 300 includes a first generative neural network 310 and a second generative neural network 320.

The first generative neural network 310 is configured to generate the initial output image 312, optionally conditioned on a conditioning input 302.

The second generative neural network 320 is configured to generate the additional output image 322 conditioned on the initial output image 312 and optionally also conditioned on the conditioning input 302.

For example, when the second generative neural network 320 includes an embedding neural network and a decoder neural network as described above with FIG. 2, the second generative neural network 320 can be conditioned on the initial output image 312 by modifying the embedding inputs that are generated for each sub-image of the additional output image 312. In particular, the system 300 can divide the initial output image 312 into sub-images, i.e., using the subscale technique described above, and then add the sub-images to the embedding input, e.g., by depth concatenating the sub-images with the padding sub-images and the already generated sub-images.

In some cases, the conditioning input 302 is a lower bit-depth image. That is, the conditioning input is an H by W image with b-bit intensity values. In these cases, the system 300 can depth upscale the conditioning image to an image that has N-bit intensity values, i.e., to a higher quality output image. To do so, the system bypasses the first neural network 310 and uses the conditioning image as the initial output image 312, i.e., only performs the processing of the second neural network 320 conditioned on the conditioning image, and then generates the final output image 324 from the conditioning image and the additional image 322.

In other cases, e.g., when the conditioning input is a lower-resolution image or a conditioning tensor, the conditioning input 302 can condition the generation of the output image on the conditioning input 302 as described above with reference to FIG. 2.

Generating output images using depth upscaling is described in more detail below with reference to FIG. 5.

Figure 4:
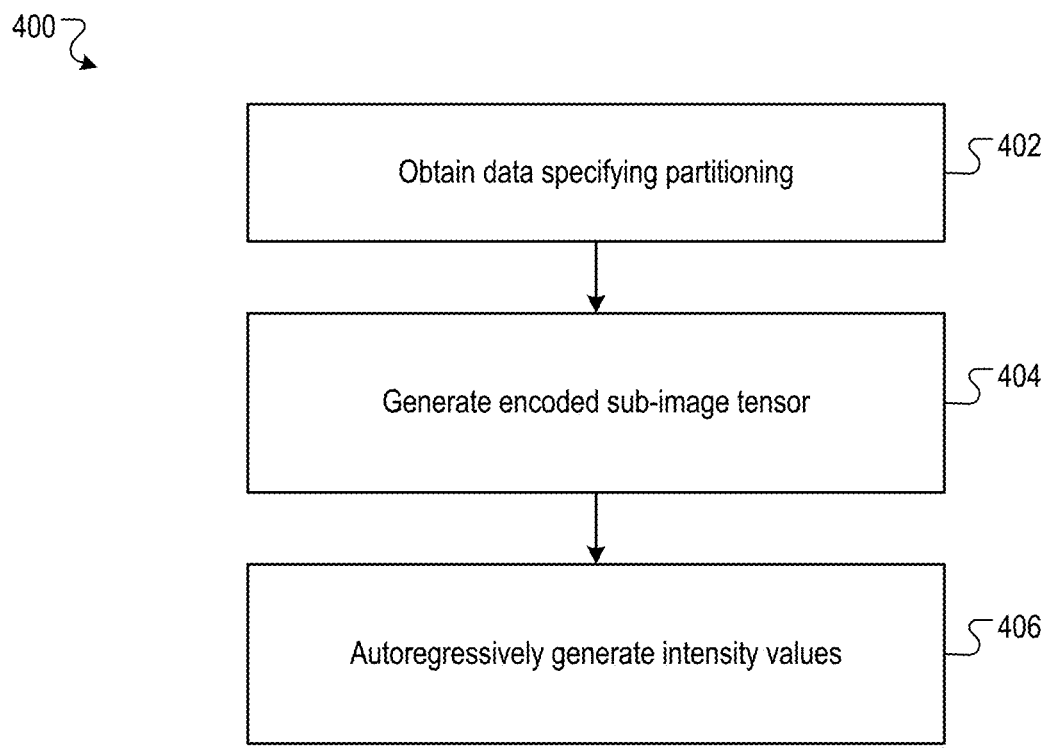
FIG. 4 is a flow diagram of an example process for generating an output image using subscaling.

FIG. 4 is a flow diagram of an example process 400 for generating an output image using sub scaling. For convenience, the process 400 will be described as being performed by a system of one or more computers located in one or more locations. For example, an image generation system, e.g., the image generation system 200 of FIG. 2, appropriately programmed, can perform the process 400.

In the example of FIG. 4, the output image being generated has a plurality of pixels arranged in an H by W pixel grid and each pixel includes a respective intensity value for each of one or more color channels that are ordered according to a color channel order. Thus, in order to generate the output image, the system needs to generate each of the intensity values for each of the pixels in the output image.

The system obtains data specifying (i) a partitioning of the H by W pixel grid into K disjoint, interleaved sub-images, wherein K is an integer that is less H, and (ii) an ordering of the sub-images (step 402). In some implementations, the system receives a scaling factor and generates the K sub-images based on the scaling factor as described above. In some other implementations, the system receives data identifying which pixels in the image are in which sub-image.

The system then generates intensity values sub-image by sub-image according to the ordering of the sub-images. In particular, for each particular color channel for each particular pixel in each particular sub-image, the system generates, using a generative neural network, the intensity value for the particular color channel conditioned on intensity values for (i) any pixels that are in sub-images that are before the particular sub-image in the ordering of the sub-images, (ii) any pixels within the particular sub-image that are before the particular pixel in a raster-scan order over the output image, and (iii) the particular pixel for any color channels that are before the particular color channel in the color channel order.

In some implementations the generative neural network includes the embedding neural network and the decoder neural network of FIG. 2 and the system generates the output image by performing steps 404 and 406 for each sub-image, starting from the first sub-image in the sub-image order and continuing in accordance with the sub-image order until the last sub-image in the order.

The system generates an encoded sub-image tensor for the sub-image from intensity values already generated for pixels in sub-images before the sub-image in the generation order using the embedding neural network (step 404).

The system autoregressively generates the intensity values for the pixels in the sub-image using the decoder neural network (step 406). Each intensity value is generated conditioned on the encoded sub-image tensor and on the intensity values that have already been generated for pixels in the sub-image.

Figure 5:
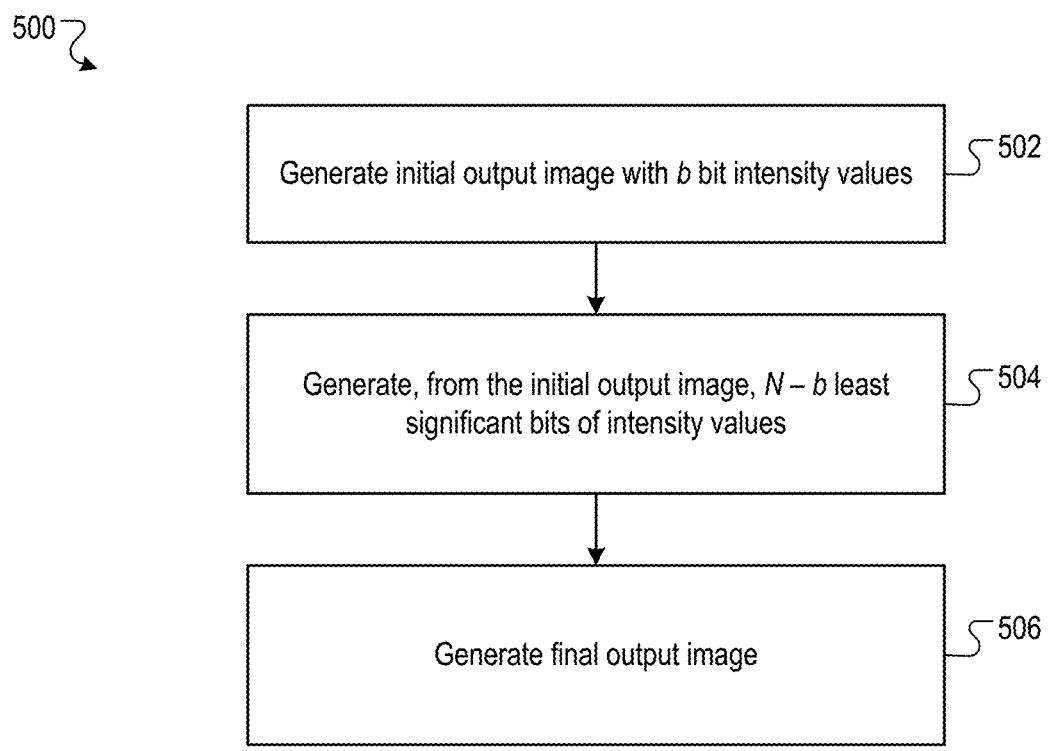
FIG. 5 is a flow diagram of an example process for generating an output image using depth upscaling.

FIG. 5 is a flow diagram of an example process 500 for generating an output image using depth upscaling. For convenience, the process 500 will be described as being performed by a system of one or more computers located in one or more locations. For example, an image generation system, e.g., the image generation system 200 of FIG. 2, appropriately programmed, can perform the process 500.

In the example of FIG. 5, the output image being generated has a plurality of pixels arranged in an H by W pixel grid and each pixel includes a respective intensity value for each of one or more color channels that are ordered according to a color channel order. Each intensity value is an N-bit value. Thus, in order to generate the output image, the system needs to generate the N bits for each of the intensity values for each of the pixels in the output image.

The system generates, using a first generative neural network, an initial H by W image (step 502). The intensity values for the pixels in the initial H by W image include only the first b most significant bits of the N bit intensity values for each of the color channels. Because b is less than N, the intensity values include only a proper subset of the intensity values that are required to be generated for the output image. The system can generate this initial output image using the generative neural network described above with reference to FIGS. 1, 2, and 4, i.e., a generative neural network that includes an embedding neural network and a decoder neural network that generates images using subscaling. Alternatively, the system can generate this initial output image using a generative neural network that uses the conventional ordering scheme described above in the illustration 102. Some examples of recurrent generative neural networks and convolutional generative neural networks that can generate images in this manner are described in PixelRNN, van den Oord, et al, arXiv:1601.06759. Other examples of convolutional generative neural networks are described in Conditional Image Generation with PixelCNN Decoders, van den Oord, et al, arXiv:1606.05328.

The system generates, from the initial H by W image and using a second generative neural network, the N−b least significant bits of the N bit intensity values of the color channels for each of the pixels in the output image (step 504). That is, the second generative neural network generates an H by W image that has N−b bit intensity values. The second generative neural network generates the N−b least significant bits of the N bit intensity values conditioned on the initial output image, i.e., conditioned on the b most significant bits of each of the intensity values.

When the second generative neural network includes an embedding neural network and a decoder neural network as described above with FIG. 2, the second generative neural network can be conditioned on the initial output image by modifying the embedding inputs that are generated for each sub-image of the additional output image. In particular, the system can divide the initial output image into sub-images, i.e., using the subscale technique described above, and then add the sub-images to the embedding input, e.g., by depth concatenating the sub-images with the padding sub-images and the already generated sub-images.

The system generates a final output image by, for each intensity value in the image, using the b bits generated by the first generative neural network as the most significant bits of the intensity value and the N−b bits generated by the second neural network as the least significant bits of the intensity value (step 506).

As described above, in some cases the system combines depth upscaling and subscaling by generating the initial output image, the additional output image, or both using subscaling.

Additionally, as described above, in some cases the conditioning input is a lower-resolution, lower-bit depth image. In these cases, the system can generate the output image by generating the initial output image using subscaling and fixing the first sub-image of the initial output image to be the lower-resolution, lower-bit depth input image.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of generating an output image having a plurality of pixels arranged in an H by W pixel grid, wherein each pixel includes a respective N bit intensity value for each of one or more color channels that are ordered according to a color channel order, wherein N is an integer greater than one, wherein the H by W pixel grid is partitioned into a plurality of sub-images that are ordered according to a sub-image order, and wherein the method comprises:

obtaining an initial H by W image, wherein the pixels in the initial H by W image include only the first b most significant bits of the N bit intensity values for each of the color channels, and wherein b is an integer that is less than N; and generating, from the initial H by W image and using a second generative neural network, the N−b least significant bits of the N bit intensity values of the color channels for each of the pixels in the output image, comprising, for each particular intensity value for each particular color channel of each particular pixel of the plurality of pixels:

generating the N−b least significant bits of the intensity value conditioned on (i) the first b most significant bits of the N bit intensity values for each of the color channels of each of the plurality of pixels in the H by W pixel grid and the N−b least significant bits of intensity values for (ii) any color channels of the particular pixel that are before the particular color channel in the color channel order, (iii) any pixels that are in sub-images that are before a particular sub-image to which the particular pixel belongs in the ordering of the sub-images, and (iv) any pixels within the particular sub-image that are before the particular pixel in a raster-scan order over the output image.

2. The method of claim 1, wherein N is 8 and b is 3.
3. The method of claim 1, wherein N is 8 and b is 4.
4. The method of claim 1, wherein N is 16 and b is 3.
5. The method of claim 1, wherein N is 16 and b is 6.
6. The method of claim 1, wherein the obtaining comprises:

generating, using a first generative neural network, the initial H by W image.

7. The method of claim 6, wherein generating, using a first generative neural network, an initial H by W image comprises conditioning the first generative neural network on a lower-resolution version of the output image.

8. The method of claim 7, wherein the first generative neural network, the second generative neural network, or both, are conditioned on a conditioning tensor characterizing a desired content of the output image, wherein each generative neural network comprises one or more convolutional layers, and wherein generating the intensity values comprises conditioning an activation function of the convolutional layers on the conditioning tensor.

9. The method of claim 6, wherein generating, using a first generative neural network, an initial H by W image comprises conditioning an instance of an embedding neural network included in the first generative neural network on the lower-resolution version of the output image.

10. The method of claim 9, wherein conditioning the instance of the embedding neural network comprises initializing a first sub-image of an embedding input to the embedding neural network with the lower-resolution version.

11. The method of claim 9, wherein generating, using a second generative neural network, the additional bits comprises conditioning another instance of the embedding neural network on the initial image.

12. The method of claim 11, wherein conditioning another instance of the embedding neural network on the initial image comprises adding the sub-images of the initial H by W image to the embedding input for each particular sub-image of the output image.

13. One or more non-transitory computer-readable storage media storing instructions that when executed by one or more computers cause the one or more computers to perform operations for generating an output image having a plurality of pixels arranged in an H by W pixel grid, wherein each pixel includes a respective N bit intensity value for each of one or more color channels that are ordered according to a color channel order, wherein N is an integer greater than one, wherein the H by W pixel grid is partitioned into a plurality of sub-images that are ordered according to a sub-image order, and wherein the operations comprise:

obtaining an initial H by W image, wherein the pixels in the initial H by W image include only the first b most significant bits of the N bit intensity values for each of the color channels, and wherein b is an integer that is less than N; and generating, from the initial H by W image and using a second generative neural network, the N−b least significant bits of the N bit intensity values of the color channels for each of the pixels in the output image, comprising, for each particular intensity value for each particular color channel of each particular pixel of the plurality of pixels:

generating the N−b least significant bits of the intensity value conditioned on (i) the first b most significant bits of the N bit intensity values for each of the color channels of each of the plurality of pixels in the H by W pixel grid and the N−b least significant bits of intensity values for (ii) any color channels of the particular pixel that are before the particular color channel in the color channel order, (iii) any pixels that are in sub-images that are before a particular sub-image to which the particular pixel belongs in the ordering of the sub-images, and (iv) any pixels within the particular sub-image that are before the particular pixel in a raster-scan order over the output image.

14. A system comprising one or more computers and one or more storage devices storing instructions that when executed by the one or more computers cause the one or more computers to perform operations for generating an output image having a plurality of pixels arranged in an H by W pixel grid, wherein each pixel includes a respective N bit intensity value for each of one or more color channels that are ordered according to a color channel order, wherein N is an integer greater than one, wherein the H by W pixel grid is partitioned into a plurality of sub-images that are ordered according to a sub-image order, and wherein the operations comprise:

obtaining an initial H by W image, wherein the pixels in the initial H by W image include only the first b most significant bits of the N bit intensity values for each of the color channels, and wherein b is an integer that is less than N; and generating, from the initial H by W image and using a second generative neural network, the N−b least significant bits of the N bit intensity values of the color channels for each of the pixels in the output image, comprising, for each particular intensity value for each particular color channel of each particular pixel of the plurality of pixels:

generating the N−b least significant bits of the intensity value conditioned on (i) the first b most significant bits of the N bit intensity values for each of the color channels of each of the plurality of pixels in the H by W pixel grid and the N–b least significant bits of intensity values for (ii) any color channels of the particular pixel that are before the particular color channel in the color channel order, (iii) any pixels that are in sub-images that are before a particular sub-image to which the particular pixel belongs in the ordering of the sub-images, and (iv) any pixels within the particular sub-image that are before the particular pixel in a raster-scan order over the output image.

15. The system of claim 14, wherein the obtaining comprises:
generating, using a first generative neural network, the initial H by W image.

16. The system of claim 15, wherein generating, using a first generative neural network, an initial H by W image comprises conditioning the first generative neural network on a lower-resolution version of the output image.

17. The system of claim 16, wherein the first generative neural network, the second generative neural network, or both, are conditioned on a conditioning tensor characterizing a desired content of the output image, wherein each generative neural network comprises one or more convolutional layers, and wherein generating the intensity values comprises conditioning an activation function of the convolutional layers on the conditioning tensor.

18. The system of claim 16, wherein generating, using a first generative neural network, an initial H by W image comprises conditioning an instance of an embedding neural network included in the first generative neural network on the lower-resolution version of the output image.

19. The system of claim 18, wherein conditioning the instance of the embedding neural network comprises initializing a first sub-image of an embedding input to the embedding neural network with the lower-resolution version.

20. The system of claim 19, wherein generating, using a second generative neural network, the additional bits comprises conditioning another instance of the embedding neural network on the initial image.

* * * * *